(12) United States Patent
Fu et al.

(10) Patent No.: US 7,638,561 B2
(45) Date of Patent: Dec. 29, 2009

(54) AQUEOUS INKJET INK COMPOSITION

(75) Inventors: Zhenwen Fu, Lansdale, PA (US);
Hailan Guo, Warrington, PA (US);
Michael Hallden-Abberton, Maple Glen, PA (US); Himal H. Ray, Collegeville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 500 days.

(21) Appl. No.: 11/147,749

(22) Filed: Jun. 8, 2005

(65) Prior Publication Data

US 2005/0282930 A1 Dec. 22, 2005

Related U.S. Application Data

(60) Provisional application No. 60/581,808, filed on Jun. 22, 2004.

(51) Int. Cl.
| | | |
|---|---|---|
| A61Q 19/06 | (2006.01) | |
| B05D 1/32 | (2006.01) | |
| B05D 1/36 | (2006.01) | |
| B05D 5/00 | (2006.01) | |
| B41J 2/01 | (2006.01) | |
| B41J 2/17 | (2006.01) | |
| B60C 1/00 | (2006.01) | |
| C08G 18/42 | (2006.01) | |
| C08G 73/10 | (2006.01) | |
| C08J 3/24 | (2006.01) | |
| C08K 5/24 | (2006.01) | |
| C08K 5/54 | (2006.01) | |
| C09D 1/00 | (2006.01) | |
| C09D 4/00 | (2006.01) | |
| C09D 5/00 | (2006.01) | |
| C09D 11/00 | (2006.01) | |
| C09K 3/00 | (2006.01) | |
| G01D 11/00 | (2006.01) | |
| H01B 3/44 | (2006.01) | |

(52) U.S. Cl. ........... 523/160; 106/31.01; 106/31.13; 106/31.25; 106/31.6; 106/31.65; 347/1; 347/84; 347/95; 347/100; 427/256; 427/258; 427/466; 523/161; 524/261; 524/265; 524/267; 524/269; 524/375; 524/385; 525/902

(58) Field of Classification Search .................. 347/1, 347/84, 95, 100; 427/256, 258, 466; 523/160, 523/161; 524/261, 265, 267, 269, 375, 376, 524/385; 525/902; 106/31.01, 31.13, 31.25, 106/31.6, 31.65
See application file for complete search history.

(56) References Cited

U.S. PATENT DOCUMENTS

| | | |
|---|---|---|
| 4,456,726 A | 6/1984 | Siol et al. |
| 4,539,361 A | 9/1985 | Siol et al. |
| 5,340,858 A | 8/1994 | Bauer et al. |
| 5,350,787 A | 9/1994 | Aydin et al. |
| 5,352,720 A | 10/1994 | Aydin et al. |
| 5,407,474 A | 4/1995 | Airey et al. |
| 5,852,075 A | 12/1998 | Held |
| 6,087,416 A | 7/2000 | Pearlstine et al. |
| 6,113,679 A | 9/2000 | Adkins et al. |
| 6,221,141 B1 | 4/2001 | Takada et al. |
| 6,337,358 B1 | 1/2002 | Whitehouse et al. |
| 6,419,732 B1 | 7/2002 | Matsumura et al. |
| 7,052,536 B2 | 5/2006 | Yatake |
| 2002/0077383 A1 | 6/2002 | Takao et al. |
| 2003/0083396 A1 | 5/2003 | Ylitalo et al. |
| 2004/0024086 A1 | 2/2004 | Segawa et al. |
| 2004/0063807 A1* | 4/2004 | Wang et al. ............. 523/160 |

FOREIGN PATENT DOCUMENTS

| | | |
|---|---|---|
| DE | 19751448 | 5/1999 |
| JP | 10-310732 | 11/1998 |
| JP | 2003-238851 A | 8/2003 |
| JP | 2004-123906 A | 4/2004 |
| WO | WO03/008509 | 1/2003 |

* cited by examiner

*Primary Examiner*—Patrick D Niland
(74) *Attorney, Agent, or Firm*—Karl Stauss

(57) ABSTRACT

An aqueous inkjet ink composition suitable for printing on a hydrophobic surface such as a vinyl surface including an aqueous vehicle, a self-dispersed pigment, a silicone-containing surfactant and an aqueous emulsion polymer having a glass transition temperature (Tg) of from −40° C. to 150° C. Also provided is a method for printing an image on a hydrophobic substrate.

9 Claims, No Drawings

AQUEOUS INKJET INK COMPOSITION

CROSS REFERENCE TO RELATED PATENT APPLICATIONS

This is a non-provisional patent application of U.S. provisional patent application Ser. No. 60/581,808 filed Jun. 22, 2004.

This invention relates to an aqueous inkjet ink composition. In particular, this invention relates to an aqueous inkjet ink composition comprising a self-dispersed pigment, a silicon containing surfactant and an aqueous emulsion polymer, suitable for printing on treated and untreated hydrophobic substrates. The invention also relates to a method for providing an image on hydrophobic substrates, including jetting the ink composition onto hydrophobic substrates, and drying the ink composition or allowing the ink composition to dry. The invention also relates to an aqueous inkjet ink composition suitable for printing a durable image on surfaces of hydrophobic substrates without the need for additional processing, including lamination, pretreatment of the surface, and the application of an overprint varnish and other protective coatings.

In inkjet printing the aqueous ink composition is sprayed on to a substrate in the form of droplets ejected from a small orifice by an electronic signal which stimulates a pulse formed either thermally (thermal) or mechanically (piezo, continuous). In response to this pulse, the ink ejects from the nozzle forming a droplet which is propelled to a specific position on the substrate surface. Once on the surface, this droplet must retain its position and dimensions sufficiently to form the image with adequate resolution after which the droplet must dry and adhere sufficiently to the substrate surface. An important problem related to aqueous inkjet compositions is that regular pigment based aqueous inks in general don't print well on hydrophobic, durable substrates known for these applications, and that such ink compositions do not adhere well to hydrophobic substrates; vinyl substrates in particular. As a result, it is difficult to get high resolution and durable images on a hydrophobic surface with an aqueous ink. Thus, it is known to pre-treat the substrate surface by coating it with an inkjet receptive layer prior to formation of the image. While such a coating can improve image quality and adhesion to the surface, the coating will increase the cost of the substrate and can decrease the water resistance of the image.

U.S. Pat. No. 6,224,141 discloses an ink comprising a self-dispersing type carbon black with at least one hydrophilic group bonded to the surface through another atomic group, an aqueous medium and a silicon compound. The pigment is a specific type of carbon black, and adhesion of the ink to a hydrophobic surface is not disclosed.

U.S. Pat. No. 6,087,416 discloses an inkjet ink composition suitable for use in printing directly to untreated vinyl substrates, the ink including an aqueous vehicle, an insoluble colorant, a polymeric dispersant, a silicone or fluorinated surfactant, and, optionally, a graft copolymer binder which is soluble in the aqueous vehicle. The insoluble colorant requires the use of a polymeric dispersant. The molecular weight and level of the graft copolymer binder materially affects the ink viscosity. In addition, fluorinated surfactants are not cost effective.

U.S. Patent Publication No. 2003/0083396 A1 discloses an ink composition containing a colorant, a vehicle and a fluorochemical surfactant. Fluorinated surfactants are preferred for anti-foaming properties, without the use of silicone-containing surfactants.

What is needed is an inkjet ink composition exhibiting improved stability and jettability, and which does not require the use of fluorinated surfactants or additional dispersants for the colorant and which can print on hydrophobic substrates.

Accordingly, the present invention provides an aqueous inkjet ink composition for printing on a hydrophobic surface comprising: (a) an aqueous vehicle; (b) a self-dispersed pigment; (c) a silicone-containing surfactant; and (d) an aqueous emulsion polymer having a glass transition temperature (Tg) of from −40° C. to 150° C. The present invention also provides a method for printing an image on a hydrophobic substrate comprising the steps of: (a) jetting onto a hydrophobic surface an aqueous inkjet ink composition comprising (i) an aqueous vehicle, (ii) a self-dispersed pigment, (iii) a silicone-containing surfactant and (iv) an aqueous emulsion polymer having a glass transition temperature (Tg) of from −40° C. to 150° C.; and (b) drying the aqueous inkjet ink composition.

Silicone-containing surfactants may be any surfactant comprising silicon atoms. Preferred silicone-containing surfactants are TEGO wet KL 245 (CAS No. 134180-76-0) and TEGO wet 280 (CAS No. 68938-54-5) made by Goldschmidt Chemical Corp., Hopewell, Va., USA. Without limitation, examples of such surfactants include one or more siloxane surfactants selected from the group consisting of:

(i) a polyether modified siloxane of the formula:

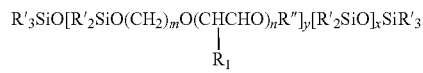

wherein R'=methyl

R''=hydrocarbon chain, and $R_1$=H for ethylene oxide, $CH_3$ for propylene oxide.

Polyether modification of polysiloxanes can be done by modification of the silicone backbone structure through the introduction of side chains. Through the introduction of various types and number of side chains, compatibility can be improved or modified. The relationship or proportion of dimethyl groups to polyether modification (x to y, in the structure diagram) allows the control of the degree of compatibility. This has an influence on surface tension. The polyether chain can be ethylene oxide (EO) and/or propylene oxide (PO). PEO is very hydrophilic, whereas PPO is hydrophobic; control of the ratios of PEO to PPO can control the degree of polarity of the entire silicone additive.

(ii) a nonionic siloxane polyoxyalkylene copolymer comprising a siloxane polymer and at least one oxyalkylene polymer, wherein the at least one oxyalkylene polymer comprises from 5% to 95% by weight of the entire copolymer. The copolymers have the general formula:

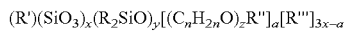

wherein R' is a hydrocarbon radical having a valence of x,

R and R'' are monovalent hydrocarbon radicals,

R''' is a member of the group consisting of alkyl radicals and $R_2Si$-radicals, x is an integer having a value of at least 1, y is an integer having a value of at least 3, n is an integer having a value of 2 to 4, a is an integer having a value of at least one and not greater than 3x, and z is an integer having a value of at least 2.

Generally the siloxane has a weight average molecular weight from about 500 to 10,000, and each of the at least one oxyalkylene polymer(s) has a weight average molecular weight from about 500 to 6,000.

Compounds (ii) above are disclosed in Bailey and O'Connor U.S. Pat. No. 2,834,748, the disclosures of which are incorporated by reference.

Preferred nonionic siloxane polyoxyalkylene copolymers are a mixture of copolymers wherein each copolymer contains a siloxane polymer and three oxyalkylene polymers in combination and have the general formula:

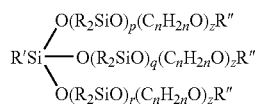

wherein R, R' and R" are monovalent hydrocarbon radicals,
p, q, and r are integers each having a value of at least 1,
n is an integer having a value of 2 to 4, and
z is an integer having a value of at least 2.

Particularly preferred compounds of type (ii) are of the formula:

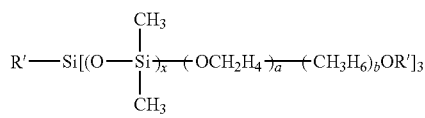

wherein R' is alkyl radicals of 1 to 4 carbon atoms,
x is 4 to 60,
(a+b)=1 to x, and
$a \geq b$.

(iii) block copolymers composed of:
(1) at least one siloxane represented by the formula:

wherein
R contains from 1 to 22 carbon atoms and is selected from the class consisting of monovalent hydrocarbon groups and divalent hydrocarbon groups, and
b=1 to 3; said siloxane block containing at least one of said siloxane units wherein at least one R group is a divalent hydrocarbon group, and
(2) at least one oxyalkylene block containing at least two oxyalkylene groups represented by the formula:

wherein R' is an alkylene group containing from 2-10 carbon atoms, and wherein the siloxane and oxyalkylene blocks are connected by the divalent hydrocarbon group.

Compounds (iii) above are disclosed in Huntington U.S. Pat. No. 3,305,504, the disclosures of which are incorporated by reference. Particularly preferred compounds of type (iii) are of the formula:

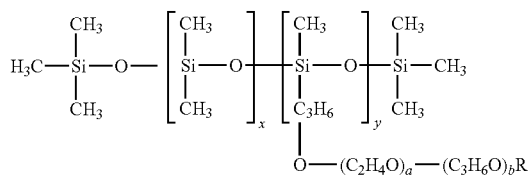

wherein R is hydrogen or alkyl radical of 1 to 4 carbon atoms,
a is 1 to 30,
b is 0 to 30,
(x+y)=4 to 60 where $x \geq y$ and $y \geq 1$.

Suitable siloxane surfactants are available from Goldschmidt Chemical Corp., Hopewell, Va. as TEGO wet; from BYK-Chemie, Wallingford, Conn., as BYK surfactants and from Union Carbide Corp., Danbury, Conn. as Silwet® surfactants. Preferred siloxane surfactants include polyether modified dimethyl siloxane and nonionic silicone glycol copolymers.

The siloxane surfactant is present in the amount of 10 to 80%, preferably 25 to 70%, and more preferably 30 to 60% by weight, based on the total weight of the surfactant mixture. One or more of the siloxane surfactants can be mixed together prior to their use as long as they form a single phase liquid.

As used herein, the term surfactant system refers to one or more surfactants used to prepare an aqueous inkjet ink composition.

The aqueous inkjet ink composition of this invention includes an aqueous emulsion polymer, typically referred to as a binder. By "aqueous" herein is meant that a medium or single phase including at least 50% water, by weight, based on the weight of the medium is present. The aqueous emulsion polymer is prepared by an emulsion polymerization process and includes at least one copolymerized ethylenically unsaturated non-ionic monomer. By "non-ionic monomer" herein is meant a monomer which is electrically neutral in the pH range of 1-14. Ethylenically unsaturated non-ionic monomers include, for example, (meth)acrylic ester monomers including methyl (meth)acrylate, ethyl(meth)acrylate, butyl (meth)acrylate, 2-ethylhexyl (meth)acrylate, isodecyl (meth) acrylate, lauryl (meth)acrylate, hydroxyethyl (meth)acrylate, and hydroxypropyl (meth)acrylate; (meth)acrylamide, (meth)acrylonitrile; styrene and substituted styrenes; butadiene; vinyl acetate, vinyl butyrate and other vinyl esters; and vinyl monomers such as vinyl chloride, vinylidene chloride.

According to one embodiment, the aqueous emulsion polymers comprise all-acrylic and styrene/acrylic polymers. According to a separate embodiment, the aqueous emulsion polymers comprise a predominantly acrylic aqueous emulsion polymer. By "predominantly acrylic" herein is meant that the polymer contains greater than 50%, by weight, copolymerized units deriving from (meth)acrylic monomers such as, for example, (meth)acrylate esters, (meth)acrylamides, (meth)acrylonitrile, and (meth)acrylic acid.

Use of the term "(meth)" followed by another term such as, for example, acrylate or acrylamide, as used throughout the disclosure, refers to both acrylates or acrylamides and methacrylates and methacrylamides, respectively.

The glass transition temperature ("Tg" herein) of the aqueous emulsion polymer is from −40° C. to 150° C., including from −20° C. to 100° C.; 40° C. to 100° C.; and from 40° C. to 90° C. Monomers and amounts of the monomers which are selected to achieve the desired polymer Tg range are well known in the art. "Tg"s used herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(\text{calc.})=w(M1)/Tg(M1)+w(M2)/Tg(M2)$$

wherein
Tg(calc.) is the glass transition temperature calculated for the copolymer
w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperatures of homopolymers are be found, for example, in "Polymer Handbook", edited by J. Brandrup and E. H. Immergut, Interscience Publishers.

The aqueous emulsion polymer has an average particle diameter from 50 to 1000 nanometers, including from 70 to 300 nanometers, as determined using a Brookhaven Model BI-90 particle sizer manufactured by Brookhaven Instruments Corporation, Holtsville N.Y., reported as "effective diameter". Also contemplated are multimodal particle size emulsion polymers wherein two or more distinct particle sizes or very broad distributions are provided as described in U.S. Pat. Nos. 5,340,858; 5,350,787; 5,352,720; 4,539,361; and 4,456,726. A preferred aqueous emulsion polymer has a swollen outer shell thickness of greater than or equal to 50 nm, more preferably ≧70 nm, as determined by the difference of the weight average particle size measurement by capillary hydro-dynamic fractionation (CHDF) and the volume average particle size measurement by dynamic light scattering (DLS).

The inkjet ink composition of the present invention typically includes the aqueous emulsion polymer at a level of 0.1% to 25% by weight, including from 0.5% to 15% by weight, based on the total weight of the ink composition.

The aqueous inkjet ink composition of this invention includes a self dispersed pigment. Self dispersed pigments are defined as pigment that do not require a polymer dispersant to achieve a stable dispersion. Examples of self dispersed pigments include pigments that have been functionalized with a group that increases the dispersion stability of the pigment. Such functional groups include for example, any hydrophilic groups such as those that can be put onto the pigment surface through oxidative processes such as chemical oxidations, plasma oxidations and ultrasonic oxidations, and any non-ionic or ionic organic groups such as those that can be attached to a pigment surface through chemical functionalization techniques known in the art such as for example those described in U.S. Pat. No. 5,571,311, and WO03/008509A1 and may also include polymer encapsulated pigments. The pigment is alternatively an organic pigment, an inorganic pigment, an organic/inorganic composite pigment, including mixtures thereof. By "organic pigment" herein is meant a pigment which is predominantly an organic compound or mixture of organic compounds, including carbon black.

Suitable organic pigments include, for example, anthroquinones, phthalocyanine blues, phthalocyanine greens, diazos, monoazos, heterocyclic yellows, pyranthrones, quinacridone pigments, dioxazine pigments, indigo, thioindigo pigments, perynone pigments, perylene pigments, isoindolene, polymer particles having at least one void, and the like. Carbon black is the generic name for small particle size carbon particles formed in the gas phase by the thermal decomposition of hydrocarbons and includes, for example, materials known in the art as furnace black, lampblack, channel black, acetylene black. Carbon black additionally encompasses treated, modified, and oxidized carbon black. A preferred black pigment is oxidized carbon black. Also preferred are carbon blacks that do not require an additional atomic group to bind the carbon black with a hydrophilic group. Suitable inorganic pigments include titanium dioxide, iron oxide, and other metal powders. Generally, the amount of pigment(s) used is from 1% to 15% by weight, including from 2% to 8% by weight, based on the total weight of the ink composition. The pigment particle size is sufficiently small so that pigment particles will not clog the nozzles on the printing device in which the ink is to be used. Typical nozzle openings on ink jet printers are 10 to 60 microns (µm) in diameter. According to one embodiment, the pigment particle size is from 0.02 to 2 µm, including from 0.02 to 1 µm, and from 0.02 to 0.3 µm in diameter.

The aqueous inkjet ink composition of this invention includes one or more water miscible or/soluble co-solvents. Preferred water miscible or/soluble co-solvents are monoalkyl ethers of certain alkylene glycols, wherein the alkyl is selected from $C_1$-$C_4$ alkyl and the alkylene glycol is selected from mono-, di-, and tri-ethylene glycol and mono-, di-, and tri-propylene glycol; 2-pyrol; 2-pyrollidone, N-methylpyrollidone; sulfolane; and mixtures thereof. The amount of water miscible or/soluble co-solvent in the ink is typically from 3% to 30% by weight, preferably from 5% to 20% by weight, based on the total weight of the ink.

The inkjet ink composition optionally includes additional surfactants which aid in control of droplet formation, surface wetting and coalescence of droplets in the printed image. Anionic and nonionic surfactants are preferred. Preferably the surfactant system does not comprise fluorinated surfactants.

The ink composition optionally includes water-miscible or water-soluble materials such as for example humectants, chelating agents, defoamers, buffers, biocides, fungicides, viscosity modifiers, bactericides, surfactants, anti-curling agents, anti-bleed agents and surface tension modifiers, all as is known in the art. Useful humectants include for example ethylene glycol, 1,3 propanediol, 1,4 butanediol, 1.4 cyclohexanedimethanol, 1,5 pentanediol, 1,6 hexanediol, 1,8 octanediol, 1,2 propanediol, 1,2 butanediol, 1,3 butanediol, 2,3 butanediol, diethylene glycol, triethylene glycol, tetraethylene glycol, polyethylene glycol having a weight average molecular weight of 200, 300, 400, 600, 900, 1000, 1500 and 2000 respectively, dipropylene glycol, polypropylene glycol having a weight average molecular weight of 425, 725, 1000 and 2000 respectively, glycerol, 1,2,6-hexanetriol, sorbitol, 2-pyrrolidone, 1-methyl-2-pyrrolidone, 1-methyl-2-piperidone, N-ethylacetamide, N-methlpropionamide, N-acetyl ethanolamine, N-methylacetamide, formamide, 3-amino-1, 2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, pantothenol, Liponic EG-1. The amounts of humectant used in the ink typically ranges from 1% to 30% by weight, including from 5% to 20% by weight, based on the total weight of the ink.

The aqueous inkjet ink composition of the invention typically has a viscosity of from 1.5 cps (centipoise) to 60 cps, including from 1.5 cps to 10 cps, particularly for certain low energy piezo and thermal printing heads.

The aqueous inkjet ink composition described herein is jetted onto a hydrophobic surface and dried. Drying includes drying the composition by methods such as for example heating, air flow, air drying and allowing the jetted composition to dry on the substrate. The aqueous inkjet ink compositions of the invention are used to print images on a wide variety of hydrophobic substrates in wide variety of forms. The term "hydrophobic" means a material that has a surface tension of less than or equal to fifty (50) dynes/cm. Hydrophobic substrates include, but are not limited to for example, opaque and transparent polyester film or molded polyester such as polyethylene terephthalate, cast vinyl sheet, extruded vinyl sheet, vinyl scrim, vinyl-coated paper substrates and polypropylene. "Vinyl" herein refers to plasticized or unplasticized polyvinyl chloride, including copolymers or blends thereof. In addition, these substrates can have a matte or gloss finish and can be self adhesive free sheets.

The applied inkjet ink composition is dried or allowed to dry. In embodiments where the aqueous emulsion polymers have a Tg higher than ambient temperature, the surface and/or the image rendered upon it can be heated to promote film formation as well as evaporation of the carrier vehicle/co-solvent. In addition to forming the film, heating also improves fixation of the image improving its resolution, decreases the time required for the image to dry and can enhance the adhesion of the film to the surface. Preferably, the heating can be done on the printer but can also be done in an oven after the printing process is complete. Additional benefits in adhesion and in image quality typically accrue when the surface is preheated before the image droplets are jetted onto the surface.

In alternative embodiments where the aqueous emulsion polymers have a Tg higher than ambient, a coalescent is incorporated into the aqueous inkjet ink composition in order to reduce the film-forming temperature of the polymer and to aid in wetting the surface.

Such printed images have many commercial end uses, but are particularly suited for labeling, banners, point of sale advertising, advertising posters, bus wraps, billboards and other durable print uses. The printed images are typically useful in a variety of format sizes ranging from, for example, small format, desktop printing of labels, wide format printing of banners or posters, to grand format printing of billboards.

Some embodiments of the invention are described in detail in the following Examples. All ratios, parts and percentages are expressed by weight unless otherwise specified, and all reagents used are of good commercial quality unless otherwise specified.

Test methods used in the Examples:

Print Method

Print tests were conducted on an ENCAD VinylJet® wide-format inkjet printer, available from Encad, Inc., San Diego, Calif., USA, using a four color ink set. The hydrophobic substrates were glossy self-adhesive backed cast vinyl films from Avery (model number MP 1005 EZ) and 3M (model number Control Tac 180-10) and calendared vinyl film from Arlon (model number Calon II).

Abrasive Adhesion Test Method

Taber linear abrasive tester with CS-10 Wearasers™. Testing was performed at the conditions: stroke length: 3", speed: 25; and loading of 600 g. The ink durability was qualitatively rated from 0 to 4 based on the following criteria:

0: no damage
1: some gloss loss, but no color loss
2: small color loss
3: medium color loss
4: severe color loss Scratch Adhesion Test Methods Adhesion of the ink was tested by rubbing the cured ink with a tissue using moderate pressure. The adhesion was qualitatively rated by examining the amount of ink transferred to the tissue and the amount of ink smeared to adjacent non-printed areas. The adhesion was further tested by scratching the image with a fingernail with moderate pressure. The adhesion was rated from 0 to 4 (best to worst).

The following examples are illustrative of the invention.

EXAMPLE 1

Aqueous Emulsion Polymer Binder Preparation

A sample of binder with the general composition of methyl methacrylate (MMA), 2-ethyl hexyl acrylate (EHA) and methacrylic acid (MM) is prepared as follows. First heat a reaction vessel containing 1226 ml deionized, buffered water (0.166 meq buffer/g water), 1.6 g ammonium persulfate (APS), and 95.6 g of an acrylic polymer dispersion (average particle size=97 nm, 45% solids) to 88° C. Next, add to this, a mixture of 262 g water, 2.30 g sodium allyl dodecyl sulfosuccinate (38.6% solids), 611 g methyl methacrylate (MMA), 143 g 2-ethylhexyl acrylate (2EHA), and 40.2 g methacrylic acid (MAA)—together with a mixture of 0.82 g ammonium persulfate (APS) and 35.6 g water, over a period of 120 minutes. After the monomer addition is completed, the vessel is held at 88° C. for 20 minutes and then cooled to 65° C., held for 45 min, then cooled to 45° C., and diluted with 132 g water. A 2617 g sample of this mixture is then neutralized to a pH of 8.0 with 4% KOH. The product is then filtered through 100 and 325 mesh screens to give the final sample. The percent (%) solids level of the sample is 31.38%, the average particle size is 259 nm (weight average by CHDF), and 338 nm (volume average by DLS—Microtrac) producing a shell size of 79 nm and the Tg is 72.8° C. by DSC.

EXAMPLE 2

Ink Formulations with Improved Stability

The ink compositions shown in Table 1 are made by blending all of the ingredients together except for the emulsion polymer (binder) and the pigment dispersions.

The binder emulsion of Example 1 is then added to the mixture gradually while stirring. The pigment dispersion is added last to the above mixture gradually while stirring. The final inks are filtered using a 1 micron fiberglass filter (made by Pall Corporation, Ann Arbor, Mich. 48103, USA). The viscosity is measured using a BrookField viscometer (made by Brookfield ENG LABS INC., Stoughton, Mass. 02072, USA) at 30 rpm with Ultra Low (UL) Adapter and spindle. The Surface tension is measured using Fisher Scientific surface tensiometer 20 (made by Fisher Scientific, USA).

The stability and the shelf life time are assessed by Oven heat-aging at 60° C. and making particle size measurements. The initial particle size is measured after the ink is filtered before any heat-aging and at specific heat-aging times at 60° C. The particle size measurements are made using a Microtrac Nanotrac 150 Particle Size Analyzer (made by Microtrac Inc. Montgomeryville, Pa. 18936).

TABLE 1

Ink Formulations With Improved Stability

| Material ID | 1 (%) | 2 (%) | 3 (%) | 4 (%) | 5 (%) | 6 (%) | 7 (%) | 8 (%) |
|---|---|---|---|---|---|---|---|---|
| Emulsion Polymer of Ex. 1 | 13.5 | 13.5 | 13.5 | 13.5 | 13.5 | 13.5 | 13.5 | 13.5 |
| 2-pyrrolidone | 12 | 12 | 12 | 12 | 12 | 12 | 12 | 12 |
| PEG-600 | 5 | 5 | 5 | 5 | 5 | 5 | 5 | 5 |
| Glycerol | 7.5 | 7.5 | 7.5 | 7.5 | 7.5 | 7.5 | 7.5 | 7.5 |

TABLE 1-continued

Ink Formulations With Improved Stability

| Material ID | 1 (%) | 2 (%) | 3 (%) | 4 (%) | 5 (%) | 6 (%) | 7 (%) | 8 (%) |
|---|---|---|---|---|---|---|---|---|
| Benzyl Alcohol | 1 | | | | | | | |
| Tergitol NP-10 | 0.4 | | | | 0.6 | | | |
| TEGO Wet KL245 | 0.8 | 0.8 | 0.8 | 0.8 | 0.8 | | | |
| TEGO Wet 250 | | | | | | 0.8 | 0.8 | 0.8 |
| Cab-O-Jet ™ 260 Magenta | 30 | | | | | | | |
| Cab-O-Jet ™ IJX 352B Black | | 20 | | | | 20 | | |
| AcryJet ™ Magenta 127 | | | 15 | | | | | |
| AcryJet ™ 357 Black | | | | 15 | | | | |
| Persulfate oxidized Carbon Black | | | | | 21 | | | |
| Bayscript Black | | | | | | | 11 | |
| Bayscript Magenta | | | | | | | | 9 |
| DI Water | rest | rest | rest | rest | rest | rest | rest | rest |
| Total | 100.0 | 100.0 | 100.0 | 100.0 | 100.0 | 100.0 | 100.0 | 100.0 |

Note:
Cab-O-Jet ™ is trademark of Cabot Corporation, Billerica, MA.
Cab-O-Jet pigment is self-dispersed pigment.
Cab-O-Jet ™ IJX352B Black is a functionalized carbon black whereby one or more hydrophilic groups are bonded to the carbon black through another atomic group.
AcryJet ™ is a trademark of the Rohm and Haas Company, Philadelphia, PA.
AcryJet pigment is polymer dispersed pigment.
The persulfate oxidized carbon black pigment is a self-dispersed black made according to the disclosure in the published patent application EP1418209.
TEGO wet ® is trademark of Goldschmidt Chemical Corp., Hopewell, VA.
TEGO wet KL245 and 250 are silicone containing surface active compositions.
Tergitol NP-10 is a nonylphenol polyethylene glycol ether, which is a nonionic surfactant made by DowChemical, Danbury, CT.
PEG-600 is polyethylene glycol, MW 600.
Bayscript black and magenta are polymer dispersed pigment dispersions from Bayer Chemicals.

TABLE 2

Ink Properties For Ink Formulations In Table 1

| Ink Properties | 1 | 2 | 3 | 4 | 5 | 6 | 7 | 8 |
|---|---|---|---|---|---|---|---|---|
| Viscosity (cp) | 2.5 | 2.2 | 4.92 | 4.60 | 3.64 | 2.3 | 2.6 | 4.8 |
| Surface tension (dyne/cm) | 25.6 | 24.8 | 35.10 | 34.80 | 27.2 | 23.4 | 23.8 | 24.4 |
| Particle Size (nm) | | | | | | | | |
| Initial | 233 | 108 | 238 | 158 | 146 | 79 | 208 | 293 |
| 7 day @ 60 C. | 216 | 70 | 664 | 424 | 133 | 83 | 376 | 355 |

Ink sample 1 contains self-dispersed color pigment (magenta) and ink samples 3 and 8 contain polymer dispersed color pigment (magenta). Inks containing polymer dispersed color pigments (3 and 8) exhibited poor heat aging stability (particle size increased in one week at 60° C.). Ink samples 2 and 6 contain self-dispersed black pigment (functionalized carbon black whereby one or more hydrophilic groups are bonded to the carbon black through another atomic group). Ink sample 5 contains self-dispersed oxidized carbon black pigment (the hydrophilic groups are bonded directly onto the carbon black). Ink samples 4 and 7 contain polymer dispersed black pigment. Inks containing self-dispersed black pigment (2, 5 and 6) exhibit better heat aging stability than inks containing polymer dispersed pigment (4 and 7).

EXAMPLE 3

Ink Formulations with Improved Jettability and Adhesion

The ink compositions shown in Table 3 are made by blending all of the ingredients together except for the emulsion polymer and the pigment dispersions. The emulsion polymer is then added to the mixture gradually while stirring. The pigment dispersion is added last to the above mixture gradually while stirring. The final inks are filtered using a 1 micron fiberglass filter made by Pall Corporation, Ann Arbor, Mich. 48103, USA. The viscosity is measured using a BrookField viscometer made by Brookfield ENG LABS INC., Stoughton, Mass. 02072, USA, at 30 rpm with Ultra Low (UL) Adapter and spindle. The surface tension is measured using Fisher Scientific surface Tensiometer 20 made by Fisher Scientific, USA.

Jettability tests are conducted on an Encad Vinyl Jet wide format printer manufactured by Encad Inc., San Diego, Calif., USA with a platen temperature of 50° C. Jettability is determined by printing at least 12.5 cm on a substrate and checking the nozzles for misfiring. If any nozzle does not print at any time during this test period it is considered a failure. The hydrophobic substrates are glossy self-adhesive backed cast vinyl films from Avery (model number MP 1005 EZ) and 3M (model number Control Tac 180-10); or glossy self-adhesive backed calendared vinyl film from Arlon (model number Calon II).

TABLE 3

Ink Formulations With Improved Jettability

| Material ID | 9 (%) | 10 (%) | 11 (%) |
|---|---|---|---|
| Emulsion polymer of Ex. 1 | 13.5 | 13.5 | 13.5 |
| 2-pyrrolidone | 12 | 12 | 12 |
| PEG-600 | 5 | 5 | 5 |
| Glycerol | 7.5 | 5 | 7.5 |
| TEGO Wet KL245 | | 0.8 | 0.8 |

TABLE 3-continued

Ink Formulations With Improved Jettability

| Material ID | 9 (%) | 10 (%) | 11 (%) |
|---|---|---|---|
| TEGO 250 | 1 | | |
| Tergitol NP-10 | | 0.4 | 0.4 |
| Benzyl Alcohol | | | 1 |
| Cab-O-Jet ™ 260 Magenta | | | |
| Cab-O-Jet ™ IJX 352B Black | | 20 | |
| Cab-O-Jet ™ 250 Cyan | | 30 | 30 |
| DI Water | rest | rest | Rest |
| Total | 100.0 | 100.0 | 100.0 |

Ink samples 9 and 10 did not pass the printing test (i.e. could not print 12.5 cm without missing nozzles or misfiring). Ink samples 1, 5 and 11 passed the printing test.

TABLE 4

Evaluation Results of Print Adhesion for Jettable Inks

| Sample No. | Taber Abrasive tester | Tissue rub resistance | Fingernail scratch test |
|---|---|---|---|
| 1 | 0 | 1 | 1 |
| 5 | 0 | 1 | 1 |
| 12 | 0 | 1 | 1 |

The ink compositions of Table 5 exhibit good stability, jettability and print adhesion.

TABLE 5

Ink Formulations With Good Stability, Jettability and Print Adhesion

| Material ID | 12 (%) | 13 (%) | 14 (%) | 15 (%) |
|---|---|---|---|---|
| Emulsion polymer of Ex. 1 | 13.1 | 13.1 | 13.1 | 13.1 |
| 2-pyrrolidone | 12 | 12 | 12 | 12 |
| PEG-1000 | 1.5 | 1.5 | | |
| PEG-1500 | | | 1 | 1 |
| Glycerol | 7.5 | 7.5 | 7.5 | 7.5 |
| Tergitol NP-10 | 0.6 | 0.6 | 0.4 | 0.6 |
| TEGO Wet KL245 | 1.2 | 1.2 | 1.2 | 1.2 |
| Cab-O-Jet ™ 260 Magenta | 30 | | | |
| Cab-O-Jet ™ 740 Yellow | | 20 | | |
| Cab-O-Jet ™ 250 Cyan | | | 30 | |
| Persulfate oxidized Carbon Black | | | | 18 |
| DI Water | 34.2 | 44.2 | 35.3 | 47.1 |
| Total | 100.1 | 100.1 | 100.5 | 100.5 |

Note:
Cab-O-Jet ™ is trademark of Cabot Corporation, Billerica, MA.
Cab-O-Jet pigment is self-dispersed pigment. The persulfate oxidized carbon black pigment is a self-dispersed black made according to the disclosure in the published patent application EP1418209, using Regal ™ 660R from Cabot Corporation.
TEGO wet ® is trademark of Goldschmidt Chemical Corp., Hopewell, VA.
TEGO wet KL245 is a silicone containing surface active composition.
Tergitol NP-10 is a nonylphenol polyethylene glycol ether, which is a nonionic surfactant made by Dow Chemical, Danbury, CT.
PEG-1000 is polyethylene glycol, MW 1000.
PEG-1500 is polyethylene glycol, MW 1500.

What is claimed is:

1. An aqueous inkjet ink composition for printing on a hydrophobic surface comprising:
    a) an aqueous vehicle;
    b) a self-dispersed pigment;
    c) a silicone-containing surfactant;
    d) benzyl alcohol and nonylphenol polyethylene glycol ether; and
    e) a polymer having a glass transition temperature (Tg) of from −40° C. to 150° C.
    wherein the polymer has a swollen outer shell, and wherein the swollen outer shell has a thickness of greater than or equal to 50 nm as determined by the difference of the weight average particle size measurement using capillary hydro-dynamic fractionation (CHDF) and the volume average particle size measurement using dynamic light scattering (DLS).

2. The composition of claim 1 wherein the aqueous emulsion polymer has a Tg of from 40° C. to 100° C.

3. The composition of claim 1 wherein the self-dispersed pigment is selected from the group consisting of anthroquinones, phthalocyanine blues, phthalocyanine greens, diazos, monoazos, heterocyclic yellows, pyranthrones, quinacridone pigments, dioxazine pigments, indigo, thioindigo pigmepts, perynone pigments, perylene pigments, isoindolene, polymer particles having at least one void, oxidized carbon black, carbon blacks that do not require an additional atomic group to bind the carbon black with a hydrophilic group, titanium dioxide, iron oxide, metal powders, and combinations thereof.

4. An ink set comprising a plurality of inks according to claim 3.

5. A method for printing an image on a hydrophobic substrate comprising the steps of:
    a) jetting onto a hydrophobic surface an aqueous inkjet ink composition comprising:
        i. an aqueous vehicle;
        ii. a self-dispersed pigment;
        iii. a silicone-containing surfactant;
        iv. benzyl alcohol and nonylphenol polyethylene glycol ether; and
        v. a polymer having a glass transition temperature (Tg) of from −40° C. to 150° C.; and
    b) drying the aqueous inkjet ink composition;
    wherein the polymer has a swollen outer shell, and wherein the swollen outer shell has a thickness of greater than or equal to 50 nm as determined by the difference of the weight average particle size measurement using capillary hydro-dynamic fractionation (CHDF) and the volume average particle size measurement using dynamic light scattering (DLS).

6. The method of claim 5 wherein the aqueous emulsion polymer has a Tg of from 40° C. to 100° C.

7. The method of claim 5 wherein the self-dispersed pigment is selected from the group consisting of anthroquinones, phthalocyanine blues, phthalocyanine greens, diazos, monoazos, heterocyclic yellows, pyranthrones, quinacridone pigments, dioxazine pigments, indigo, thioindigo pigments, perynone pigments, perylene pigments, isoindolene, polymer particles having at least one void, carbon black, titanium dioxide, iron oxide, metal powders, and combinations thereof.

8. The method of claim 5 wherein the hydrophobic surface comprises polyvinyl chloride, polyester or polypropylene.

9. The method of claim 5 further comprising the step of heating the surface and/or the image rendered upon it before the drying step.

* * * * *

UNITED STATES PATENT AND TRADEMARK OFFICE
CERTIFICATE OF CORRECTION

PATENT NO. : 7,638,561 B2  Page 1 of 1
APPLICATION NO. : 11/147749
DATED : December 29, 2009
INVENTOR(S) : Fu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this

Ninth Day of November, 2010

David J. Kappos
*Director of the United States Patent and Trademark Office*